United States Patent [19]

Ackerman et al.

[11] 4,200,986
[45] May 6, 1980

[54] DIGITAL INDICATOR

[75] Inventors: Gary M. Ackerman; Nicholas Edgington, both of Worcester, Mass.

[73] Assignee: AIT Corporation, Worcester, Mass.

[21] Appl. No.: 944,347

[22] Filed: Sep. 21, 1978

[51] Int. Cl.² .............................................. G01B 7/34
[52] U.S. Cl. .......................... 33/174 P; 33/DIG. 13; 73/105
[58] Field of Search ............. 33/174 P, 174 Q, 174 L, 33/172 E, 143 L, 147 N, 149 J, DIG. 13; 324/130, 95; 73/133 R, 105

[56] References Cited

U.S. PATENT DOCUMENTS

| | | | |
|---|---|---|---|
| 3,924,458 | 12/1975 | Woodworth et al. | 73/133 R |
| 4,106,333 | 8/1978 | Salje' et al. | 73/105 |

FOREIGN PATENT DOCUMENTS 1109238  4/1968  United Kingdom .................. 33/149 J

*Primary Examiner*—Willis Little
*Attorney, Agent, or Firm*—Wolf, Greenfield & Sacks

[57] ABSTRACT

The digital indicator measures surface deviations from a reference measurement point and employs a probe or plunger positionable against a part that is being measured such as a machine part. The device basically comprises, in addition to the probe or plunger, strain gage means, an amplifier for receiving signals from the strain gage means, a digital volt meter, a digital display, and a momentary setting swtich. A preliminary signal from the strain gages at an initial pressure level is coupled via the amplifier to a differential input of the digital volt meter. The momentary switch nulls the meter to zero for the initial reading with deviations of either polarity being subsequently registered and displayed on the digital display.

14 Claims, 1 Drawing Figure

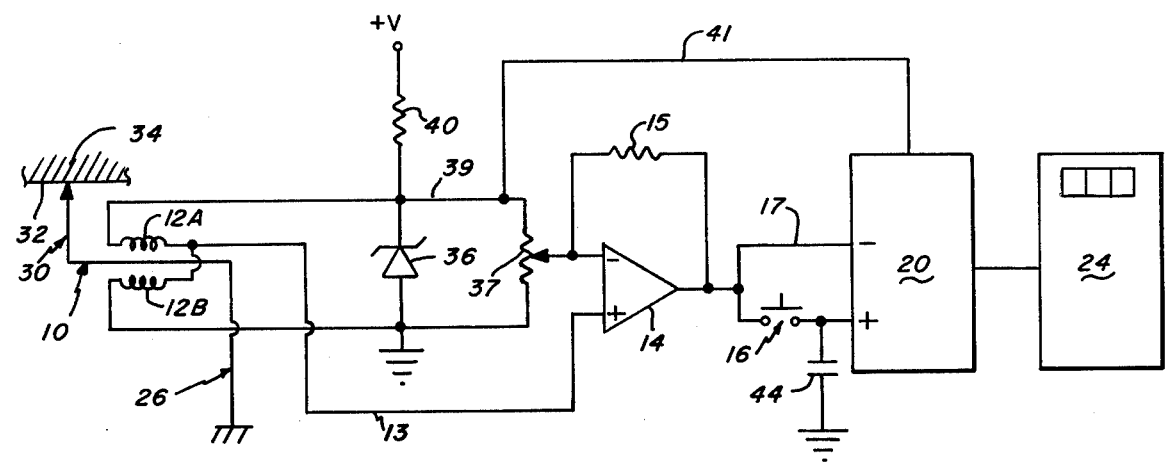

DIGITAL INDICATOR

BACKGROUND AND SUMMARY OF THE INVENTION

The present invention relates in general to a digital indicator, and pertains, more particularly, to a digital readout indicator that utilizes strain gages for the measurement of surface deviation from a reference measurement.

The device of the present invention has extensive use in making surface deviation measurements such as in the making of machine parts to detect any out-of-roundness or out-of-flatness of the product. In the prior art such as in the Woodworth, et al U.S. Pat. No. 3,924,458, strain gages have been used in connection with the measurement of pressures. However, in accordance with the present invention a new use is found wherein strain gages may be employed in connection with the measurement of a surface deviation. Present instruments used for such surface deviation measurements include dial-type indicators which are costly, time consuming to operate, not totally accurate, and not easily readable. Other prior art patents known at this time include U.S. Pat. Nos. 3,784,912; 3,978,399; 3,509,460; 3,501,696; 3,667,041; 3,070,786; 3,576,128; 3,910,106; 4,082,999; 3,589,457; 3,617,878; 3,826,983; 3,652,299; and 4,082,998.

Accordingly, it is an object of the present invention to provide an improved indicator for registering measurements in surface deviation.

Another object of the present invention is to provide an indicator for such measurements wherein the measurements of deviation are displayed in a digital format.

A further object of the present invention is to provide a digital indicator for the measurement of surface deviation with an arrangement that is relatively simple in construction not requiring complex circuitry such as shown in, for example, U.S. Pat. No. 3,784,912.

Still another object of the present invention is to provide a digital indicator for the measurement of surface deviation employing a simple zeroing technique and preferably employing the combination of a momentary switch with a hold circuit.

A further object of the present invention is to provide a digital indicator for the surface deviation wherein the indicator can be operated quite readily by even an unskilled operator requiring as the method of operation, simply positioning the probe or plunger against the surface with a sufficient pressure and operating the momentary switch to zero the indicator with all subsequent measurements indicating deviations from this desired reference surface.

To accomplish the foregoing and other objects of this invention there is provided an indicator for digitally displaying a measurement in surface deviation from a reference measurement. The indicator generally comprises a cantilever means having contact means preferably in the form of a plunger or probe for contacting the surface to be measured. Means are provided for supporting the cantilever means so that the contact means thereof is positioned in contact with the surface with at least a minimum predetermined pressure against the surface that is being measured. Strain gage means are associated with the cantilever means preferably in the form of a pair of strain gages attached to opposing surfaces of the cantilever means. From the strain gage means there is provided a control signal preferably coupled from the common connection between the pair of strain gages. The indicator device also includes digital meter and display means preferably in the form of a digital volt meter having its output coupled to a liquid crystal display or similar display. The digital meter and display means has differential inputs. The indicator device also includes a momentarily operable hold means preferably including a momentary switch and holding capacitor, with one side of this means coupled to one of the differential inputs. An amplifier or the like preferably couples the strain gage signal to the other side of the hold means and also directly to the other one of the differential inputs.

In accordance with the method of use of the device of this invention the plunger or probe is adjustable in its position relative to the surface being measured and in operation of the device this plunger is positioned with at least a slight predetermined pressure on the surface so as to cause the cantilever to move thereby causing in turn an unbalance of the strain gages. In accordance with the invention, different embodiments may be provided employing either a single strain gage or two strain gages or possibly even more than two strain gages. Any unbalance of the strain gages is amplified preferably by an operational amplifier and this initial unbalance signal is coupled to the digital meter and display means at one input thereof. Upon operation of the momentarily operable hold means the differential inputs to the digital volt meter are alike thus zeroing the meter and displaying a zero on the display. Upon release of the hold means one of the inputs to the digital volt meter is essentially held constant at the initial setting while the other input tracks the signal from the strain gage means so as to register any subsequent deviations detected during a scanning of the part, the surface of which is being measured for surface deviations.

BRIEF DESCRIPTION OF THE DRAWING

Numerous other objects, features and advantages of the invention should now become apparent upon a reading of the following detailed description taken in conjunction with the accompanying drawing Figure which shows a schematic diagram of a preferred embodiment of the indicator of this invention employing a pair of strain gages, an amplifiers, a digital volt meter, and a display.

DETAILED DESCRIPTION

The sole drawing schematically depicts a digital indicator for measuring and registering surface deviation. The digital indicator shown in the drawing basically comprises a cantilever member 10, strain gages 12A and 12B, operational amplifier 14, momentary hold switch 16, digital volt meter 20, and liquid crystal display 24. The cantilevered member 10 is shown schematically and is supported by a cantilever restraint or support member 26. At the free end of the cantilever 10, there is provided a probe or plunger 30 shown resting against the surface 32 of a part 34 whose surface is being measured for any surface deviations. The probe 30 is depicted schematically in the drawing but preferably has associated therewith an adjusting means such as an adjusting screw or the like for varying the pressure with which the probe 30 contacts the surface 32. In accordance with the invention, it is necessary to see that the probe 30 is forced with at least a minimum pressure against the surface 32. The exact magnitude of this initial pressure is not critical as long as there is sufficient pressure to maintain the probe 30 in contact with the surface 32.

The strain gages 12A and 12B may each be of conventional design and, although schematically depicted in the drawing as separated from the cantilever 10, are in actuality secured to opposite surfaces of the cantilever member 10. These strain gages operate on the principle of a resistance change based upon the pressure sensed by each strain gage. The common connection between the strain gages couples by way of line 13 to one input of the operational amplifier 14. In the drawing line 13 is shown coupled to the positive input of the amplifier. The amplifier 14 contains a typical resistor 15 coupled between an input and output of the amplifier. The other sides of the strain gages 12A, and 12B couple to respective sides of zener diode 36 and potentiometer 37. The potentiometer 37 and the zener diode 36 are coupled in parallel. The zener diode 36 is biased by means of a resistor 40 coupled in series with the zener diode between a voltage source. Actually, one side of the zener diode is grounded as are also one side of resistor 37 and one side of strain gage 12B. The zener diode 36 provides a regulated voltage at line 39 so that the uncommon side of strain gage 12A is also at a fixed position voltage level. This regulated voltage is also coupled by way of line 41 to the digital volt meter 20 for powering the meter. Similarly, power could be coupled to the display 24 depending upon the type of display that is used.

The movable arm of potentiometer 37 couples to the other input of amplifier 14 disclosed in the drawing as the negative input to this amplifier. Thus, the amplifier 14 has a fixed reference voltage set by potentiometer 37 at its negative input and a variable voltage coupled by way of line 13 to its positive input. This positive control voltage at line 13 is dependent upon the position of the cantilever member as sensed by the strain gage windings 12A and 12B.

The output of amplifier 14 couples by way of line 17 directly to one of the differential inputs of the digital volt meter 20. In the disclosed embodiment, line 17 couples to the negative input. The output of amplifier 14 also couples to one side of momentary hold switch 16. The other side of switch 16 couples to both capacitor 44 and the other, or positive input of digital volt meter 20. The digital volt meter 20 may be of the type that has its own display but in the drawing there is shown a separate liquid crystal display 24 for displaying a voltage in digital form corresponding to a differential voltage signal at the inputs to the digital volt meter.

In the operation of the device of this invention the probe or plunger 30 is operated so that its end contacts the surface 32 with a minimum pressure. This movement which did not have to be exactly controlled causes the cantilever member 10 to move some fixed position with the strain gage windings 12A and 12B having a resistance value that provides a control voltage signal on line 13. This initial setting causes either a positive or negative output voltage from the amplifier 14 depending upon whether the control signal is of a greater or less magnitude than the reference signal to the amplifier 14. In this regard the potentiometer 37 is adjusted to balance the input to the amplifier 14 to approximately the same voltage as might be expected on the control signal input to the amplifier 14. This maintains the amplifier in its linear region of operation.

The strain gage windings 12A and 12B are essentially connected in series and thus form a voltage divider network with their resistances changing in a complementary fashion so that as the cantilever member flexes in one direction, the resistance of one of the strain gages increases while the resistance of the other decreases to provide a control signal on line 13 representative of the deflection of the cantilever member.

As previously mentioned, when the probe 30 is positioned with pressure against the surface 32, there is an output voltage from the amplifier 14 which is a function of the difference in voltage at the input. The amplifier 14 is preferably set to have a gain of approximately 400. This setting is determined at least in part by the resistor 15. The output from amplifier 14 couples directly by way of line 17 to the negative input of digital volt meter 20. At this time there may be a reading because of an inequality of voltages at the differential inputs to the meter. At this initial stage of operation, it is noted that the path through the switch 16 and capacitor 44 is open by means of the normally open momentary switch 16. However, once the probe is properly positioned, the switch 16 is operated momentarily to its closed position causing the capacitor 44 to charge to the same voltage level as applied to the negative input by way of line 17. At this time the meter is effectively nulled or zeroed with the display 24 depicting a reading of zero. This is a zero reading because both positive and negative inputs to the digital volt meter 20 are at the same level, regardless of what this level is.

The capacitor 44 is of substantially large value and typically may be a 10 microfarad capacitor. The bias current at the positive terminal to the digital volt meter may be on the order of 1 MM amp and thus the holding time or discharge time of capacitor 44 is quite long on the order of at least 10,000 seconds. Because the readings of surface deviation are taking over a relatively short period of time in comparison to this hold interval, the capacitor 44 can be considered as maintained during the reading interval at substantially the same initial voltage. However, any changes in the output from amplifier 14 caused by movement of the probe 30 and associated cantilever member 10 cause a change of the voltage level on line 17 in either a positive or negative sense. This signal on line 17 thus represents any deviation from the initial setting; the deviation being recorded as a difference voltage sensed by the digital volt meter and displayed by the liquid crystal display 24.

Once one part or piece has been tested for surface deviations, then substantially the same procedure is followed for each other part with the switch 16 being operated to zero the meter for each part being tested.

Having described one embodiment of the present invention, it should now become apparent to those skilled in the art that numerous other embodiments are contemplated as falling within the scope of the invention. For example, the arrangement has been shown in a preferred embodiment of a pair of strain gage windings, however, a single winding could also be used possibly in association with a series resistor for providing the control signal such as the signal on line 13 in the drawing. Also, the polarities discussed with reference to the amplifier and digital volt meter may be reversed or even one of them reversed without changing the basic operation of the device.

What is claimed is:

1. An indicator for digitally displaying measurement in surface deviation from a reference measurement, comprising;
    cantilever means having contact means for contacting the surface to be measured,
    means supporting the cantilever means so that the contact means is positioned to contact with the surface,
    strain gage means associated with the cantilever means for providing a control signal,
    ditigal meter and display means having differential inputs,
    a hold means having one side coupled to one of the differential inputs,
    and means coupling the control signal to the other side of the hold means and to the other of the differential inputs,
    said hold means including means for receiving the control signal to establish a substantially constant level at said one of the differential inputs, both said differential inputs being initially nulled at the constant level and means for maintaining said one of the differential inputs at the substantially constant level during a measurement period, the control signal coupled to the other of the differential inputs providing a deviation reading at the display means.

2. An indicator as set forth in claim 1 wherein said cantilever means has fixed support means at one end and probe means forming the contact means at the free end.

3. An indicator as set forth in claim 2 wherein said strain gage means includes a pair of strain gages on either side of the cantilever means said strain gages being coupled in series between a voltage reference.

4. An indicator as set forth in claim 3 including means for establishing the voltage reference coupled to one input of an amplifier means, the other input to the amplifier means being coupled from the strain gages at their common connection.

5. An indicator as set forth in claim 4 wherein said digital meter and display means includes a digital volt meter and display.

6. An indicator as set forth in claim 5 wherein said hold means includes a momentary switch and capacitor having a relatively long hold time.

7. An indicator as set forth in claim 1 wherein said means coupling the control signal includes amplifier means having a reference input including means for establishing a reference voltage therefor, and a control input for receiving the control signal, the output from said amplifier means being a signal of magnitude and polarity corresponding to the difference of the input signals.

8. An indicator as set forth in claim 7 wherein the hold means comprises a momentary switch and a capacitor means.

9. A method of measuring surface deviation of a part from an initial measurement using a differential input display device for registering relative surface deviation from the initial measurement and a probe positionable against the surface being measured with at least a minimum pressure, generating a control signal representative of probe position and having an initial control signal level corresponding to the initial measurement, the control signal adapted to vary from the initial level indicative of surface deviations from the initial meausrement, coupling the variable control signal to one input of the differential input display device, and maintaining the initial control signal level at the other input of the differential input display device a measurement period whereby the variable control signal enables registering of surface deviation from the initial control signal level.

10. An indicator for displaying measurement in surface deviation from an initial reference measurement level comprising; a probe means positionable against the surface being measured, means responsive to probe position for providing a control signal representative of probe position, differential input display means for displaying the relative surface deviation from the reference measurement level, means for providing at one input of the differential input display means a substantially constant reference signal corresponding to the inital reference measurement level, and means coupling the control signal, as it may vary during a measurement period, to the other input of the differential input display means whereby the variable control signal deviation from the reference signal is representative of relative surface deviation.

11. An indicator as set forth in claim 10 wherein the probe means includes a cantilever means and means for supporting the cantilever means to contact the surface with at least a predetermined minimum pressure.

12. An indicator as set forth in claim 10 wherein the means for providing a control signal includes strain gauge means and amplifier means.

13. An indicator as set forth in claim 10 wherein the means for providing a substantially constant reference signal includes a sample and hold means.

14. An indicator as set forth in claim 13 wherein the sample and hold means includes a storage means having a relatively long time constant and switch means for enabling operation of the storage means.

* * * * *